United States Patent
Heinrich

[11] Patent Number: 6,142,903
[45] Date of Patent: Nov. 7, 2000

[54] CHAIN FOR CONTINUOUSLY VARIABLE TRANSMISSION

[75] Inventor: Johannes Heinrich, Friedrichsdorf, Germany

[73] Assignee: LuK Getriebe-Systeme GmbH, Buhl/Baden, Germany

[21] Appl. No.: 09/204,840

[22] Filed: Dec. 3, 1998

[30] Foreign Application Priority Data

Dec. 5, 1997 [DE] Germany .......................... 197 53 910

[51] Int. Cl.[7] ............................ F16G 13/04; F16G 13/02
[52] U.S. Cl. .......................................... 474/215; 474/229
[58] Field of Search .................................. 474/202, 206, 474/212, 213, 214, 215, 226, 228, 229, 232, 233

[56] References Cited

U.S. PATENT DOCUMENTS

| | | | |
|---|---|---|---|
| 4,344,761 | 8/1982 | Steuer | 474/245 |
| 4,547,182 | 10/1985 | Rattunde | 474/214 |
| 4,581,001 | 4/1986 | Rattunde et al. | 474/214 |
| 4,631,042 | 12/1986 | Rattunde | 474/8 |
| 4,710,154 | 12/1987 | Rattunde | 474/242 |
| 4,927,404 | 5/1990 | Rattunde | 474/242 |
| 5,026,331 | 6/1991 | Sugimoto et al. | 474/215 |
| 5,242,334 | 9/1993 | Sugimoto et al. | 474/215 |
| 5,345,753 | 9/1994 | Okuda et al. | 474/215 |
| 5,427,583 | 6/1995 | Wolf | 474/206 |
| 5,651,746 | 7/1997 | Okuda | 474/215 |
| 5,728,021 | 3/1998 | Van Rooij et al. | 474/229 |
| 5,941,059 | 8/1999 | Kanehira et al. | 474/215 |

Primary Examiner—David A. Bucci
Assistant Examiner—Matthew A. Kaness
Attorney, Agent, or Firm—Darby & Darby

[57] ABSTRACT

A link chain for a continuously variable cone pulley gear whose link pins connecting the individual chain links 1,2; 11,12 are formed as pairs of rocker members 25. The end faces of the rocker members 25 transfer the friction forces between the cone pulleys and the link chain. The rocker members are secured at least in part by retaining elements 20,33 against moving sideways out of the recesses in the chain links. One retaining plate 20,33 is allocated to at least the outside chain links of the chain defining the chain width. The retaining plate 20,33 is mounted on the outside of the outer chain link and is fixed on the rocker members associated with the chain link with a clamping seat 28–31; 44–47 which leaves the rocker faces free. The structural unit formed from at least one retaining plate 20,33 and the associated rocker members has a design which allows a change in the spacing of these rocker members in the chain longitudinal direction.

12 Claims, 4 Drawing Sheets

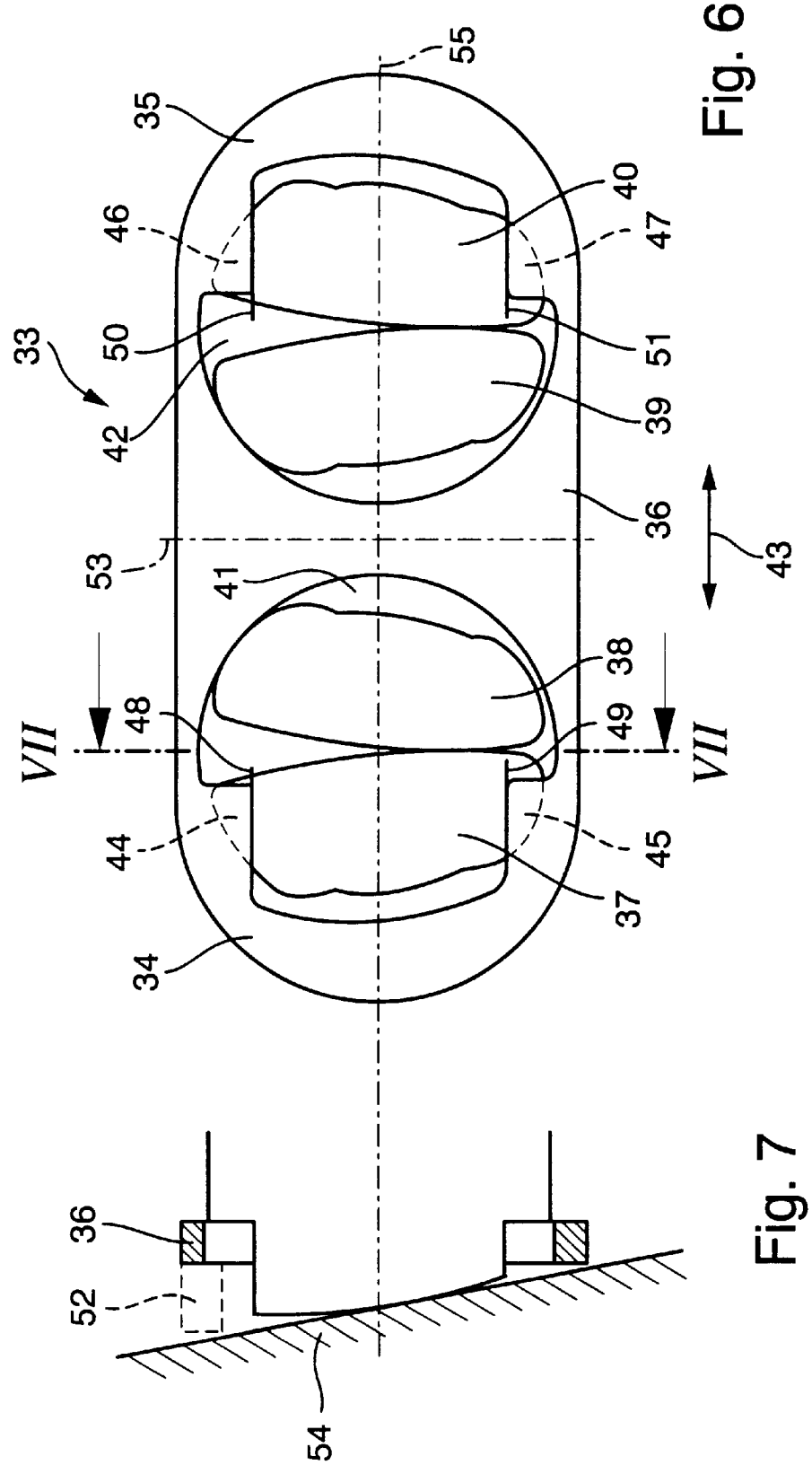

CHAIN FOR CONTINUOUSLY VARIABLE TRANSMISSION

The invention relates to a link chain for a continuously variable cone pulley transmission. Individual chain links are formed by groups of links connected by link pins which are formed as pairs of rocker members inserted in apertures of the links and having rocker faces supported on each other. The rocker members are connected to the plates associated with their chain link at least in part by a positive anti-rotation lock. The end faces of the rocker members facing the relevant cone pulley transfer friction forces between the cone pulleys and the link chain. The rocker members are secured at least in part by at least one retaining element against moving sideways out of the plate apertures.

Link chains of this kind are known inter alia from DE 1 302 795, 23 56 289, 35 26 062 as well as EP 0 741 255 the contents of which are incorporated herein by reference. The link pins there are pairs of rocker members which roll on each other. The rocker members of one pair can be the same or different. Only one of the two rocker members may serve to transfer friction force between the cone pulleys and the link chain. As a rule for transferring the friction force the friction faces of the cone pulleys and the end faces of the rocker members have a ball shape corresponding to a curved path and confronting each other. secure the connection between the links and rocker members, thus to prevent the chain from breaking up into its constituent parts through the links falling off or through the rocker members moving out sideways.

To this end DE 1 302 795 proposes that the rocker members have recesses between the outer links transverse to its longitudinal extent on one of its edges, recesses in which a plate of each chain link engages by a nose. This structural design complicates the manufacture of the rocker members and their assembly since with the assembly of the chain into an endless body, the last rocker member to be inserted has to be held by a retaining element in the form of a thin circular ring shaped disc into whose bore a locking face projects which is brought into engagement with one of the recesses of this rocker member by swivelling the disc. The chain according to DE 23 56 289 is constructed in a similar way only with some measures for simplifying assembly whilst the faults mentioned above still basically remain.

In order to overcome these a basically different method is described in DE 35 26 062 which uses as retaining element a metal member fixed on the rocker members on the outside next to the chain links by energy beam welding. However with automatic chain production this structural shape gives rise to a certain unreliability in manufacture as well as running the risk of the chain becoming contaminated by welding beads. With chains where the rocker members protrude slightly over the width of chain provided by the sets of links such security is not sufficient since the links can tilt away over the edge of the rocker members opposite the retention area.

Finally EP 0 741 255 proposes to clamp all the plates of one chain link on the rocker members associated with same. This not only makes assembly difficult since the plates have to be threaded onto the rocker members by overcoming the clamping force or the rocker members have to be pushed in the recesses by overcoming the clamping force of all the plates of one chain member but also it does not lead to a permanent security. For in order to increase their bearing capacity, modern chains are stretched after assembly by applying considerable tensile forces in order to achieve a uniform mutual support of all component parts. However with a stretching process of this kind the said clamping forces are considerably reduced or lost altogether so that again an insecure state of at least some individual rocker members occurs.

The object of the invention is therefore to design a link chain of the type mentioned above whereby with an extremely easy and simple assembly it is possible to ensure a permanent retention of the links and where applicable of the rocker members against moving out sideways.

This is achieved according to the invention through the characterising features of claim 1.

These measures according to the invention mean that to secure the links against falling out sideways it is not the chain links themselves which serve to transfer the load which are used, but—which is often sufficient—one retaining link is used per outside link on one chain side, whereby the retaining link is not exposed to the said stretching process at least not to the extent that it would thereby undergo the change in shape desired for the supporting chain links. This has the result that the clamping forces of the retaining links can not be impaired either during stretching of the chain or with corresponding load-conditioned length changes in the chain so that they can carry out their task of retaining the links against falling out sideways in the predetermined manner.

The retaining links according to the invention which can preferably be designed with thin walls compared with the remaining chain links can however also be associated with each chain link in order to secure all rocker members against lateral displacement. The retaining links of such chain links which do not contain any outside links can thereby be mounted basically at any position inside the set of plates or links belonging to the chain link.

According to a first structural shape it can be provided that the retaining links are formed by clamping yokes seated on the rocker members and at least one connecting yoke which connects the clamping yokes and is resiliently length-adjustable in the longitudinal direction of the chain. The clamping yokes can thereby sit on the rocker members with a contour of their recesses corresponding substantially to the anti-rotation lock and more advantageously for a secure hold surround the rocker members through an arc of at least approximately 180 degs whilst the connecting yokes have a preferably curved path which can be resiliently stretched in the longitudinal direction of the chain and which advantageously has a curved shape across the longitudinal direction of the chain towards the outside of the chain. These retaining links thereby permanently enclose the rocker members provided for same since during stretching of the chain or with load-conditioned changes in length thereof they readily follow on through the resilient pliability of their connecting yokes without affecting the clamping yokes and thus their fixed seat on the associated rocker members.

The structural form of the retaining link described is basically suitable for any of the positions mentioned above inside a chain-forming set of links. Compared to this the structural form according to the invention described below is best suited for use next to an outside link.

With this structural form the retaining links are formed by clamping yokes seated on the rocker members rotationally connected to the chain link and displaceable in the longitudinal direction of the chain and by connecting means supporting the clamping yokes like links.

For this it is proposed that the clamping yokes engage in corresponding cross-sectional reductions at the ends of the rocker members by two projections projecting opposite one another across the longitudinal direction of the chain into the recess for the associated end of the rocker member, that the cross-sectional reductions are open towards the free end of the rocker members and that the projections and ends of the rocker members are mutually clamped through pairs of surfaces extending substantially in the running direction of the chain and parallel to the longitudinal direction of the rocker members. Thus the relevant rocker member is secured in its two possible displacement directions. On the other hand the arrangement of the pairs of surfaces substantially in the longitudinal direction of the chain allows a mutual displacement between the clamping yoke and rocker member so that changes in the length of the chain do not act to deform the clamping yokes.

In order to eliminate the danger in all cases that these retaining links could gradually slide down through relative movements between the clamping yokes and rocker members it is proposed that the outer side face of the connecting means of the retaining links has at least one support nose which comes into contact with the associated cone pulleys and which is formed for example by a stamped area of the connecting means.

Further features and details important to the invention will be apparent from the following description of embodiments illustrated in the drawings in which:

FIG. 6 is a side view of a second embodiment of a retaining link according to the invention; and FIG. 7 is a sectional view VII—VII of FIG. 6 showing a variation of the retaining link according to FIG. 6;

Figure 1:
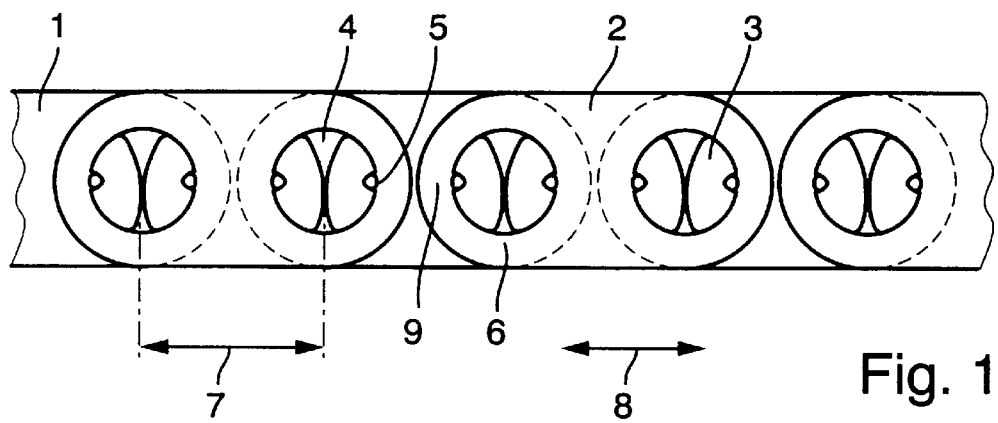
FIG. 1 is a side view of a known link chain with double link join.
Figure 3:
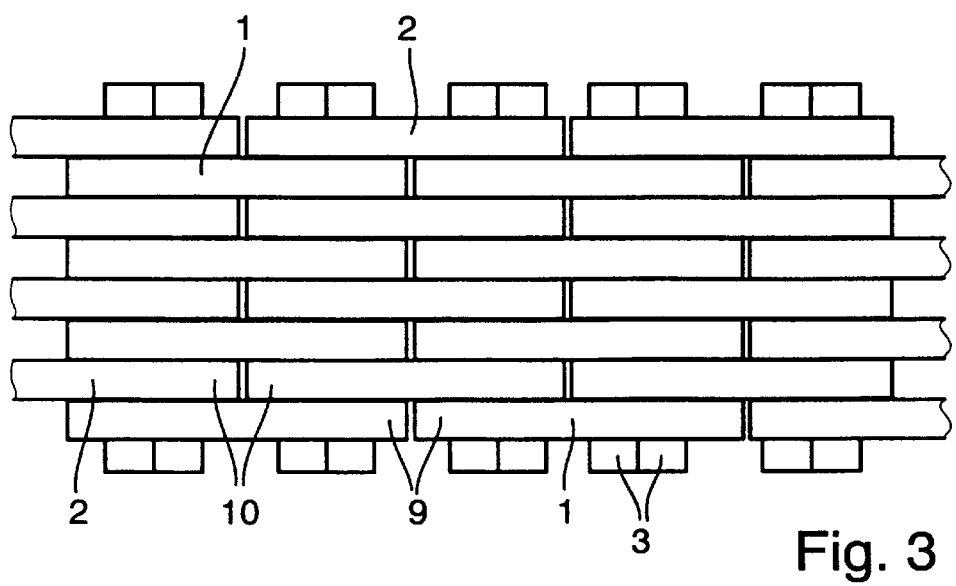
FIG. 3 is a plan view of the link chain according to FIG. 1.

FIGS. 1 and 3 show a side view and plan view respectively of a piece of a known link chain with normal chain plates 1 and outside chain plates 2 wherein the outside chain plates 2 determine the width of the chain. The chain links formed by the chain plates 1 and 2 are connected together for articulated movement by articulation members which consist of pairs of rocker pins 3 which are inserted in apertures 4 of the chain plates and are connected rotationally with each relevant associated chain plate by a positive-locking connection 5. The rocker pins 3 have concave rocker faces 6 directed towards each other as a result of which they can roll on each other to produce the articulated movement of adjoining chain links.

The individual articulated joints have from centre to centre a distance 7 which is generally termed the chain spacing. The magnitude of this chain spacing 7 is dependent on the dimension of the rocker pins 3 in the running direction 8 of the chain and on the distance required between the individual apertures 4. As is known the chain spacing 7 can be constant over the entire chain length but it is however also possible to change the spacing irregularly where applicable within certain limits in order to have a favourable effect on the noise developed by the chain when in use.

It can be seen from the plan view in FIG. 3 that the chain is constructed as a so-called double-plate assembly, which means that in each case two radial end webs 9 and 10 of adjoining chain plates lie next to one another between two pairs of rocker pins 3 corresponding to which the spacing between the articulated joints formed by these rocker pins is determined.

Figure 4:
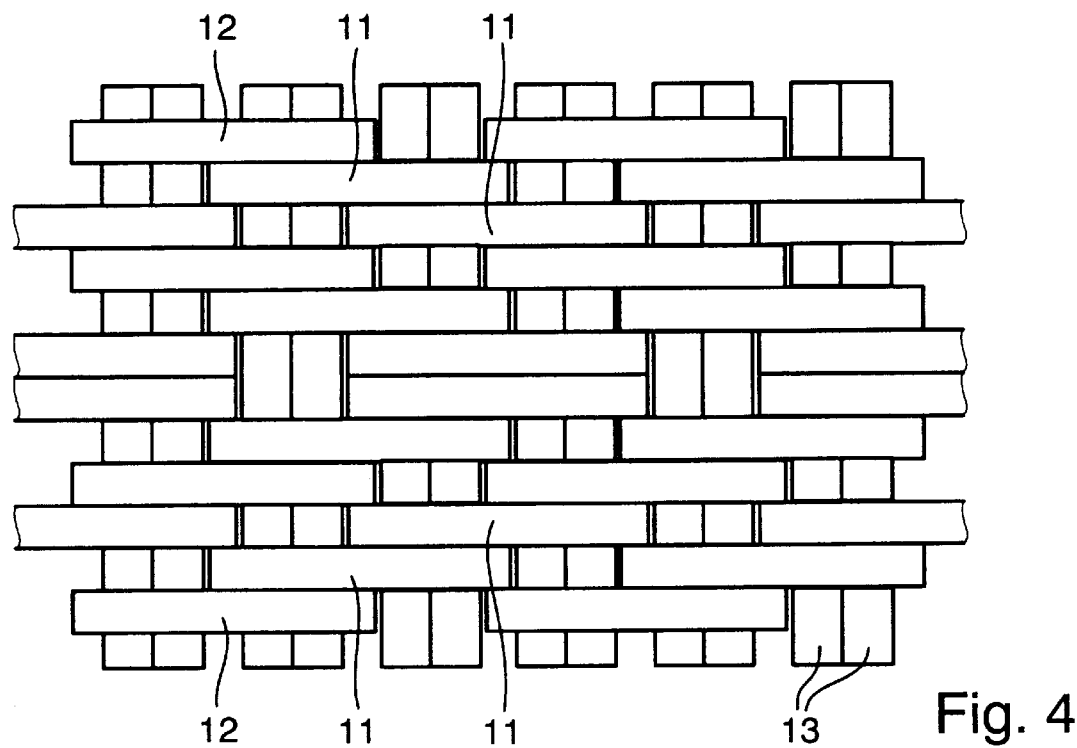
FIG. 4 is a plan view corresponding to FIG. 3 showing a triple link join of a known link chain according to FIG. 2.

From the plan view of FIG. 4 it can be seen how known triple-plate chain assemblies are constructed. Here, seen over the width of the chain, the normal plates 11 and the outside plates 12 are each off-set relative to each other in the running direction of the chain by a spacing whereby the chain is indeed widened by half across the running direction but whereby on the other side the distance between the articulated joints formed by pairs of rocker pins 13 can be reduced to half compared to the double-plate assembly according to FIG. 3.

Figure 2:
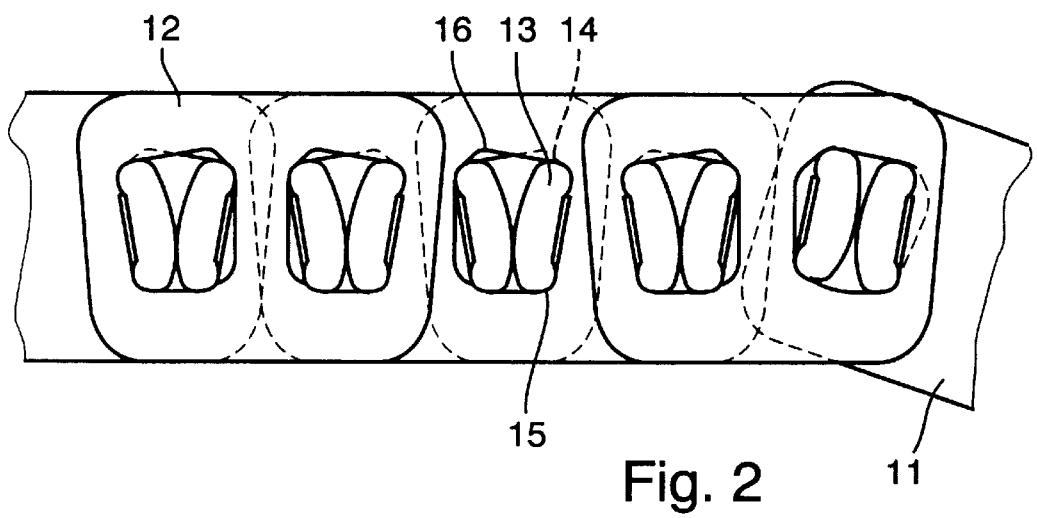
FIG. 2 is a side view of another structural form of a known link chain.

The plan view according to FIG. 4 corresponds to another known chain form shown in side view in FIG. 2 with normal plates 11 and outside plates 12 wherein the articulation pieces consist of pairs of rocker pins 13. These rocker pins 13 are designed so that they still only contact the apertures 16 in the plates at two points 14 and 15. Between the bearing points 14 and 15 the rocker pins 13 are free from the plates 11, 12.

With the known chain forms described by way of example with reference to FIGS. 1 to 4 there are no measures to secure the outside plates 2, 12 from falling out or even all the rocker members 3 and 13 from moving or slipping sideways out of the chain assembly so that in certain circumstances there is the danger of the chain becoming undone or falling apart.

In order to counteract this a retaining plate is now provided for the outside plates on at least one chain side or for each of the chain-forming chain links, as shown in FIGS. 5 to 8.

Figure 5:
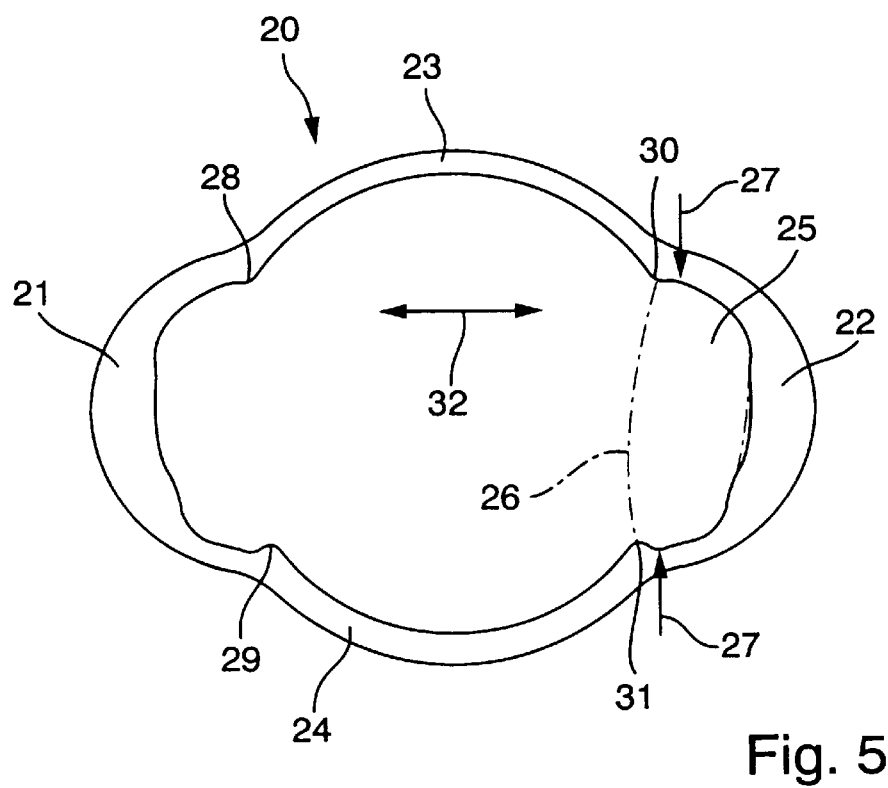
FIG. 5 is a side view of a first embodiment of a retaining link according to the invention.

FIG. 5 shows a retaining plate 20 which in basic construction consists of clamping yokes 21, 22 and connecting yokes 23, 24 which hold these together to form the retaining plate. The clamping yokes 21, 22 are clamped onto rocker members 25 associated with the chain link and corresponding substantially to the rocker members 3 and 13, and surround the rocker members substantially through an arc of 180° whilst leaving the rocker face 26 free. The active clamping force is shown diagrammatically by the arrow 27. To counteract the tendency of the clamping yokes 21, 22 to slip off from the rocker members 25 a nose 28, 29, 30, 31 is formed at the ends of the clamping yoke to surround the transition radius with which the rocker face 26 of the rocker members 25 runs into the further path of the outer contour of the rocker members.

The connecting yokes 23, 24 which hold the clamping yokes 21, 22 together have as shown a curved path relative to the longitudinal direction of the chain indicated by the arrow 32 through which they can be resiliently elastically stretched in the direction of arrow 32 so that a change of spacing of the chain joints formed by the pairs of rocker members which (change) results from a change in length, more particularly an increase in the length of the chain, cannot cause a three-dimensional distortion on the clamping yokes, more particularly with regard to their clamping seat on the rocker members 25.

As is not shown in particular the retaining plate can be thin-walled compared with the remaining plates 1, 2, 11, 12 of the chain so that it can readily be fitted at any suitable position inside the chain width, more particularly next to the outer plates 2, 12.

Figure 8:
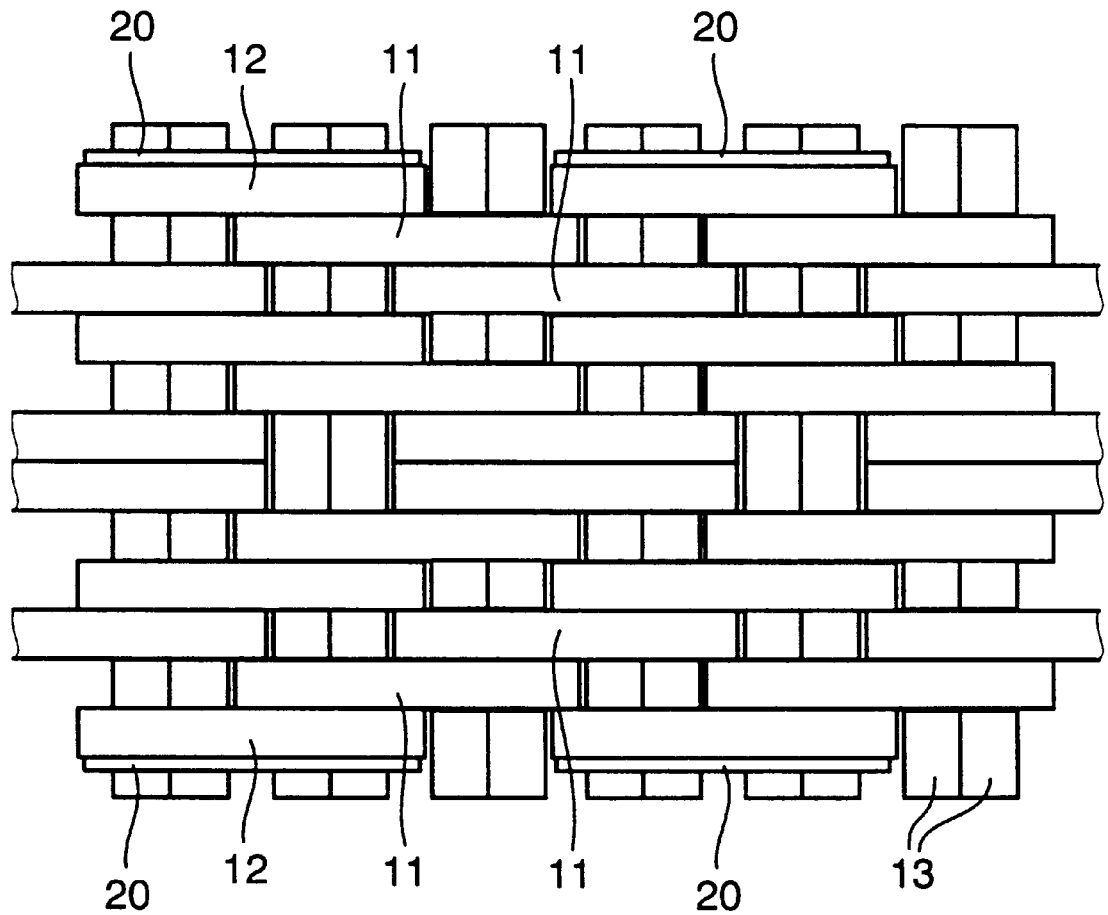
FIG. 8 is a further plan view of the embodiment of FIG. 4 with the addition of retaining plates.

FIGS. 6 to 8 show a different structural form for a retaining plate provided generally with the reference numeral 33 and which again basically comprises clamping yokes 34, 35 and connecting means 36 supporting the yokes.

The connecting means are plate-like corresponding to the plates 1, 2 shown in FIG. 1 but can also readily be straight-lined connecting webs comparable with the connecting yokes 23, 24 according to FIG. 5. The recesses 41, 42 formed by the retaining plate 33 for the rocker members 37, 38, 39, 40 join up or merge with each other. In the embodiment according to FIG. 6 the clamping yokes 34, 35 are each provided with two projections 44, 45 and 46, 47 respectively which project opposite one another and transversely of the longitudinal direction 43 of the chain into the recesses 41, 42 for the associated end of the rocker members 37, 40. Corresponding cross-sectional reductions 48, 49, and 50, 51 engage with these projections and open towards the free end of the relevant rocker members 37, 40. The design is such that the projections 44 to 47 and the ends of the rocker members 37, 40 are mutually clamped against each other through pairs of surfaces extending substantially in the running direction 43 of the chain and parallel to the longitudinal direction of the rocker members. The pairs of surfaces stand perpendicular on the drawing plane of FIG. 6 and the clamping forces act perpendicular to the longitudinal direction 43 of the chain in the drawing plane. A slight incline in the pairs of surfaces relative to the longitudinal direction of the chain is thus harmless and can even be desirable for technical reasons when punching out the retaining plates in manufacture.

This design has the result that the rocker members 37 and 40 on the one hand and the retaining plate 33 on the other can be displaced relative to each other in the longitudinal direction of the chain so that a change in the length of the chain and thus an increase in the spacing between adjoining articulated chain links does not have any deforming effect on the clamping yokes 34, 35 although these are rigidly connected together through the connecting means 36 in the longitudinal direction 43 of the chain.

As is apparent the retaining plates 33 are appropriate only for use as outer plates. Since on the other hand through the relative movement between the clamping yokes 34, 35 and rocker members 37, 40 which is possible in the longitudinal direction 43 of the chain the possibility cannot be ruled out that the retaining plates 33 work down from the ends of the rocker members, it is advantageous to provide the connecting means 36 with a support nose 52 (in the manner shown in FIG. 7) which can be formed by way of example as a stamped out area in the longitudinal centre 53 of the connecting means. During running of the chain this support nose comes into contact with the associated cone pulley 54, only shown in FIG. 7, and thus prevents the retaining plate 33 from moving to the left, referred to FIG. 7. As can be seen from FIG. 7 the support nose 52 is mounted radially outwards relative to the circumferential curve of the chain between the cone pulleys since the connecting means 36 are anyway on the radially inner side close to the cone pulley 54. Depending on the circumstances of each individual case the support nose 52 can however also be given another position, for example in relation to FIG. 6 in the area of the intersection between the vertical centre line 53 and the horizontal centre line 55 of the retaining plate 33.

The retaining plate 33 described with reference to FIGS. 6 to 8 can also be thin-walled compared with the remaining chain plates since like the retaining plate 20 it does not play a part in transferring the load directed through the cone pulley gearbox.

What is claimed is:

1. Link chain for continuously variable transmission cone pulley gearbox whose articulation pieces which connect together the individual chain links which are formed as sets of plates are constructed as pairs of rocker members inserted in apertures in the plates and having rocker faces supported against each other, wherein the rocker members are connected to the plates which make up the chain at least partially through a positive locking anti-rotation lock, the end faces of the rocker members facing the relevant cone pulley transfer friction forces between the cone pulleys and the link chain and the rocker members are secured at least in part by at least one retaining element against moving sideways out from the plate apertures, characterised in that a retaining plate is associated with at least the outer plates of the chain which determine the chain width, relative to the chain link associated with same at least on one chain side, that the retaining plate is held on the outside of the outer chain plate, that the retaining plate is fixed on the rocker members associated with the chain link with a clamping seat which leaves the rocker faces free, and that the relevant structural unit formed from at least one retaining plate and the associated rocker member has a design which allows the spacing of these rocker members to be changed in the longitudinal direction of the chain.

2. Link chain according to claim 1 characterised in that at least one retaining plate is allocated to each chain link.

3. Link chain according to claim 2 characterised in that the retaining plates are formed by clamping yokes seated displaceable in the longitudinal direction of the chain on the rocker members connected rotationally to their chain link and by connecting means which support the clamping yokes like plates.

4. Link chain according to claim 8 characterised in that the clamping yokes engage into corresponding cross-sectional reductions of the ends of the rocker members by two projections which project opposite one another transverse to the longitudinal direction of the chain into the aperture for the end of the associated rocker members that the cross-sectional reductions are open towards the free end of the rocker members and that the projections and the ends of the rocker members are tightly clamped against each other through pairs of surfaces which extend substantially in the running direction of the chain and parallel to the longitudinal direction of the rocker members.

5. Link chain according to claim 3 characterised in that the outer side face of the connecting means has at least one support nose which comes into contact with the associated cone discs.

6. Link chain according to claim 5 characterised in that the support nose is formed by a stamped out area of the connecting means.

7. Link chain according to claim 1 characterised in that the retaining plates are formed by clamping yokes seated on the rocker members and at least one connecting yoke connecting the clamping yokes and resiliently adjustable in length in the longitudinal direction of the chain.

8. Link chain according to claim 7 characterised in that the clamping yokes are seated on the rocker members with the contour of their recesses corresponding substantially to an anti-rotation lock.

9. Link chain according to claim 7 characterised in that the clamping yokes engage round the rocker members through an arc of at least approximately 180°.

10. Link chain according to claim 7 characterised in that the connecting yokes follow a curved path in the longitudinal direction of the chain.

11. Link chain according to claim 10 characterised in that the connecting yokes have a shape which, transverse to the longitudinal direction of the chain is curved towards the outside of the chain.

12. Link chain according to claims 1 characterised in that the retaining plates formed thin-walled compared with the remaining chain links.

\* \* \* \* \*